US009577800B2

(12) United States Patent
Seo et al.

(10) Patent No.: US 9,577,800 B2
(45) Date of Patent: Feb. 21, 2017

(54) METHOD AND DEVICE FOR RECEIVING SIGNAL IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Byounghoon Kim, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 14/382,878

(22) PCT Filed: Mar. 5, 2013

(86) PCT No.: PCT/KR2013/001749
§ 371 (c)(1),
(2) Date: Sep. 4, 2014

(87) PCT Pub. No.: WO2013/133599
PCT Pub. Date: Sep. 12, 2013

(65) Prior Publication Data
US 2015/0049693 A1    Feb. 19, 2015

Related U.S. Application Data

(60) Provisional application No. 61/606,978, filed on Mar. 5, 2012.

(51) Int. Cl.
*H04L 5/00* (2006.01)
(52) U.S. Cl.
CPC ............ *H04L 5/0032* (2013.01); *H04L 5/005* (2013.01); *H04L 5/0069* (2013.01); *H04L 5/0096* (2013.01); *H04L 5/0085* (2013.01)

(58) Field of Classification Search
CPC ...... H04L 5/0032; H04L 5/005; H04L 5/0069; H04L 5/0085; H04L 5/0096
(Continued)

(56) References Cited

U.S. PATENT DOCUMENTS

2010/0278132 A1* 11/2010 Palanki ............... H04B 1/7107
370/329
2011/0216682 A1* 9/2011 Xu .......................... H04L 1/0027
370/311
(Continued)

OTHER PUBLICATIONS

R1-120026, 3GPP TSG RAN WG1 Meeting #68;Title: Obtaining information of neighboring cells CRS; Dresden, Germany, Feb. 6-10, 2012.*
(Continued)

*Primary Examiner* — Andrew Lai
*Assistant Examiner* — Albert Shih
(74) *Attorney, Agent, or Firm* — Dentons US LLP

(57) ABSTRACT

A method for a terminal to receive a signal in a wireless communication system according to one embodiment of the present invention comprises a step for confirming whether a configuration change exists for a cell-specific reference signal (CRS) of a neighboring cell, and if the CRS configuration is changed for a neighboring cell, the method for receiving s signal comprises the steps of: receiving system information of the neighboring cell and acknowledging the changed CRS configuration thereby; and receiving s signal from a serving cell by means of the changed CRS configuration of the neighboring cell.

5 Claims, 11 Drawing Sheets

(58) Field of Classification Search
USPC .................................... 370/329, 252, 328
See application file for complete search history.

(56) References Cited

U.S. PATENT DOCUMENTS

| | | | | |
|---|---|---|---|---|
| 2011/0267937 | A1* | 11/2011 | Yoo | H04J 11/005 370/201 |
| 2012/0033646 | A1* | 2/2012 | Luo | H04J 11/0056 370/336 |
| 2012/0046030 | A1* | 2/2012 | Siomina | G01S 5/00 455/423 |
| 2012/0115485 | A1* | 5/2012 | Narasimha | H04W 68/02 455/437 |
| 2012/0163305 | A1* | 6/2012 | Nimbalker | H04W 52/0206 370/329 |
| 2013/0022096 | A1* | 1/2013 | Kazmi | H04L 27/2602 375/224 |
| 2013/0039268 | A1* | 2/2013 | Blankenship | H04W 56/0015 370/328 |
| 2013/0083877 | A1* | 4/2013 | Gorokhov | H04J 11/0073 375/354 |
| 2013/0294271 | A1* | 11/2013 | Nagata | H04W 24/10 370/252 |
| 2013/0315191 | A1* | 11/2013 | Yoshimoto | H04J 11/0056 370/329 |
| 2014/0064133 | A1* | 3/2014 | Kazmi | H04W 24/10 370/252 |

OTHER PUBLICATIONS

R1-113865; 3GPP TSG-RAN WG1 #67 ; San Francisco, USA, Nov. 14-18, 2011 Title: Consideration on signalling of some candidate solutions for feICIC.*

R1-120490; 3GPP TSG RAN WG1 Meeting #68 Dresden, Germany, Feb. 5-10, 2012.*

MediaTek Inc., "Consideration on Signalling of some candidate solution for feICIC", R1-113865, 3GPP TSG-RAN WG1 #67, San Francisco, USA, Nov. 14-18, 2011.

Huawei, et al., "Obtaining information on neighboring cells CRS", R1-120026, 3GPP TSG RAN WG1 Meeting #68, Dresden, Germany, Feb. 6-10, 2012, pp. 1-2.

LG Electronics, "Necessary Signalling and Air Interface Changes for Further Enhanced Non-CA Based ICIC", R1-113977, 3GPP TSG-RAN WGI #67, San Francisco, CA, USA, Nov. 14-18, 2011, pp. 1-6.

Panasonic, "Signalling support for CRS interference handling in low power ABS", R1-120222, 3GPP TSG RAN WG1 Meeing #68, Dresden, Germany, Feb. 6-10, 2012, pp. 1-3.

Alcatel-Lucent Shanghai Bell et al., "Further Consideration of CRS Processing in FeICIC", R1-120490, 3GPP TSG RAN WG1 Meeting #68, Dresden, Germany, Feb. 6-10, 2012, pp. 1-2.

\* cited by examiner

FIG. 5
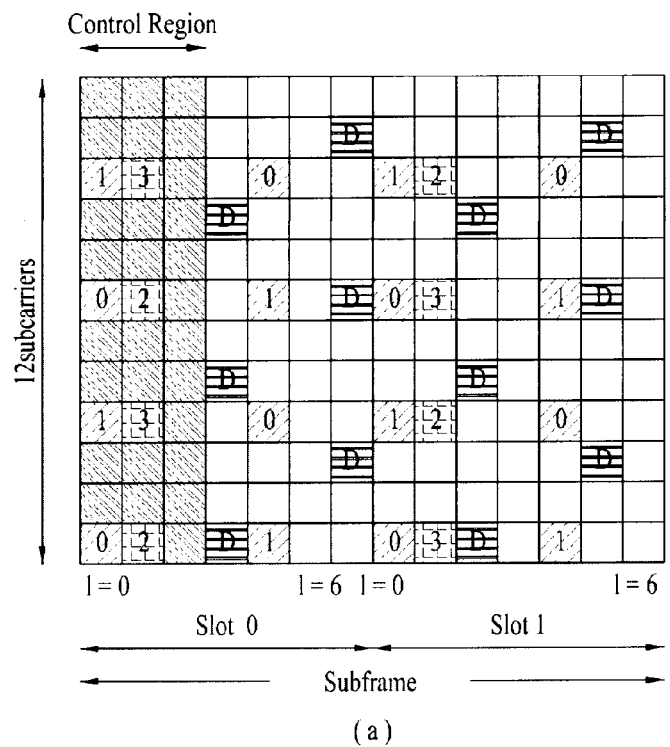
(a)
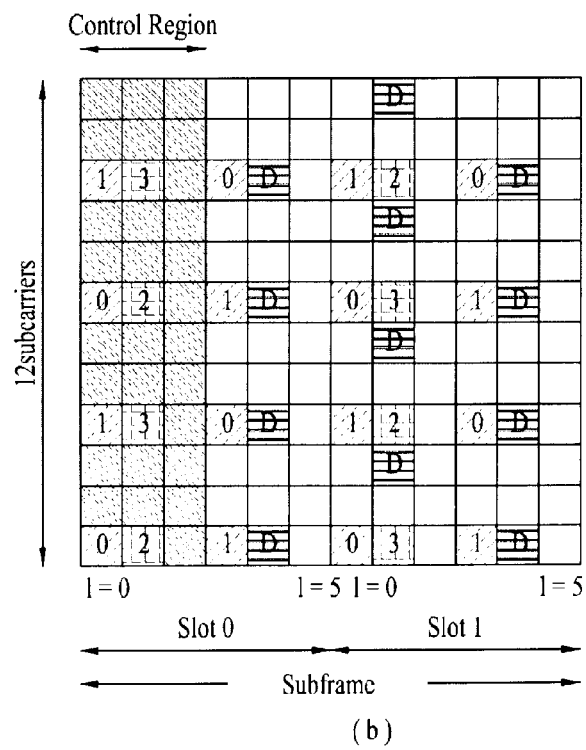
(b)

MeNB : macro eNodeB  
PcNB : pico eNodeB  
FeNB : femto eNodeB

MUE : macro UE  
PUE : pico UE  
FUE : femto eNodeB

FIG. 8
☐:Null REs  ▨:CRS
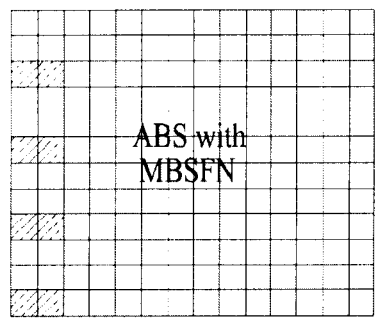
(a)
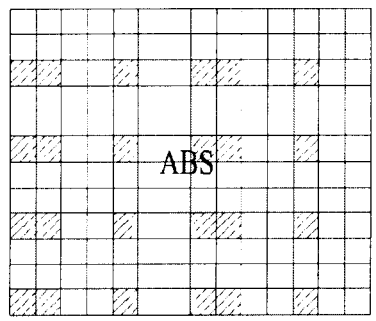
(b)

METHOD AND DEVICE FOR RECEIVING SIGNAL IN WIRELESS COMMUNICATION SYSTEM

This application is a National Stage Entry of International Application No. PCT/KR2013/001749 filed Mar. 5, 2013, which claims priority to U.S. Provisional Application No. 61/606,978 filed Mar. 5, 2012, both of which are incorporated herein by reference.

TECHNICAL FIELD

The present invention relates to a wireless communication system, and more particularly, to a method and apparatus for receiving a signal if inter-cell interference coordination is applied.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The present invention discloses techniques related to a method of receiving a signal for reducing interference caused by a specific reference signal of a neighbor cell in case of applying inter-cell interference coordination.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of receiving a signal received by a user equipment in a wireless communication system, including the steps of checking a presence or non-presence of a CRS (cell specific reference signal) configuration change of a neighbor cell, if the CRS configuration of the neighbor cell is changed, recognizing the changed CRS configuration by receiving a system information of the neighbor cell, and receiving the signal from a serving cell using the changed CRS configuration of the neighbor cell.

In a $2^{nd}$ technical aspect of the present invention, provided herein is a user equipment device in a wireless communication system, including a receiving module and a processor, the processor checking a presence or non-presence of a CRS (cell specific reference signal) configuration change of a neighbor cell, the processor, if the CRS configuration of the neighbor cell is changed, recognizing the changed CRS configuration by receiving a system information of the neighbor cell, the processor receiving the signal from a serving cell using the changed CRS configuration of the neighbor cell.

The following matters may be included in the $1^{st}$ and $2^{nd}$ technical aspects of the present invention entirely or in part.

The step of checking the presence or non-presence of the CRS configuration change may be based on a CRS configuration valid period information received from the serving cell.

The step of checking the presence or non-presence of the CRS configuration change may be based on an indicator indicating whether the system information of the neighbor cell is obtained.

The system information may include at least one of an information transmitted on a physical broadcast channel (PBCH) and an information transmitted on a system information block (SIB).

The user equipment may further receive an indicator indicating which one of the information transmitted on the PBCH and the information transmitted on the SIB should be decoded.

The step of checking the presence or non-presence of the CRS configuration change may be based on at least one of a PBCH valid period information of the neighbor cell and an SIG valid period information of the neighbor cell.

The step of checking the presence or non-presence of the CRS configuration change may be based on an aggressor cell list and an MBSFN (multicast broadcast single frequency network) pattern.

If the neighbor cell is included in the aggressor cell list and the MBSFN pattern information linked to the neighbor cell is present, the user equipment may determine that the CRS configuration of the neighbor cell has been changed.

The aggressor cell list may include a subset of a neighbor cell list.

If the neighbor cell is included in the aggressor cell list and the MBSFN pattern information linked to the neighbor cell is not present, the user equipment may determine that a partial information in the CRS configuration has been changed only.

The partial configuration may include number information of CRS antenna ports.

The signal received from the serving cell may not include data in a resource element corresponding to the changed CRS configuration of the neighbor cell.

The signal receiving step may include the step of puncturing a resource element corresponding to the changed CRS configuration of the neighbor cell.

Advantageous Effects

According to the present invention, it is able to considerably reduce influence of interference caused by a cell-specific reference signal transmitted by a neighbor cell in a heterogeneous network environment having inter-cell interference coordination applied thereto.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incor

FIG. 5 is a diagram to describe a reference signal.

FIG. 8 is a diagram to describe ABS (almost blank subframe).

BEST MODE FOR INVENTION

Figure 1:
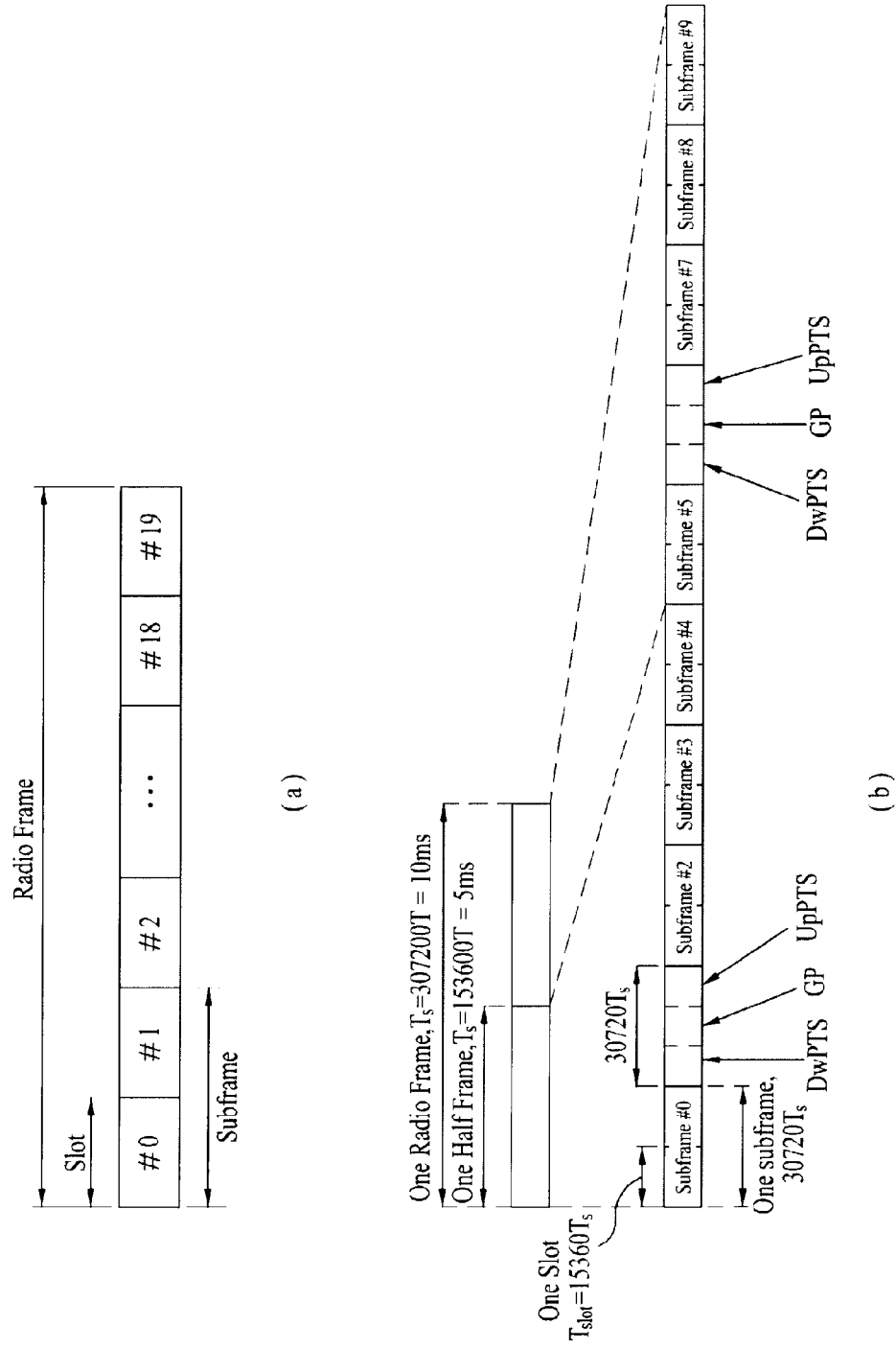
- FIG. 1 is a diagram for a structure of a radio frame.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting unclear, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e specifications (e.g., WirelessMAN-OFDMA reference system) and advanced IEEE 802.16m specifications (e.g., WirelessMAN-OFDMA advanced system). For clarity, the following description mainly concerns 3GPP LTE system or 3GPP LTE-A system, by which the technical idea of the present invention may be non-limited.

A structure of a radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1(a) is a diagram for a structure of a radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1(b) is a diagram for a structure of a radio frame of type 2. The type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, irrespective of a type of a radio frame, 1 subframe consists of 2 slots.

The above-described structures of the radio frame are just exemplary. And, the number of subframes included in a radio frame, the number of slots included in the subframe and the number of symbols included in the slot may be modified in various ways.

Figure 2:
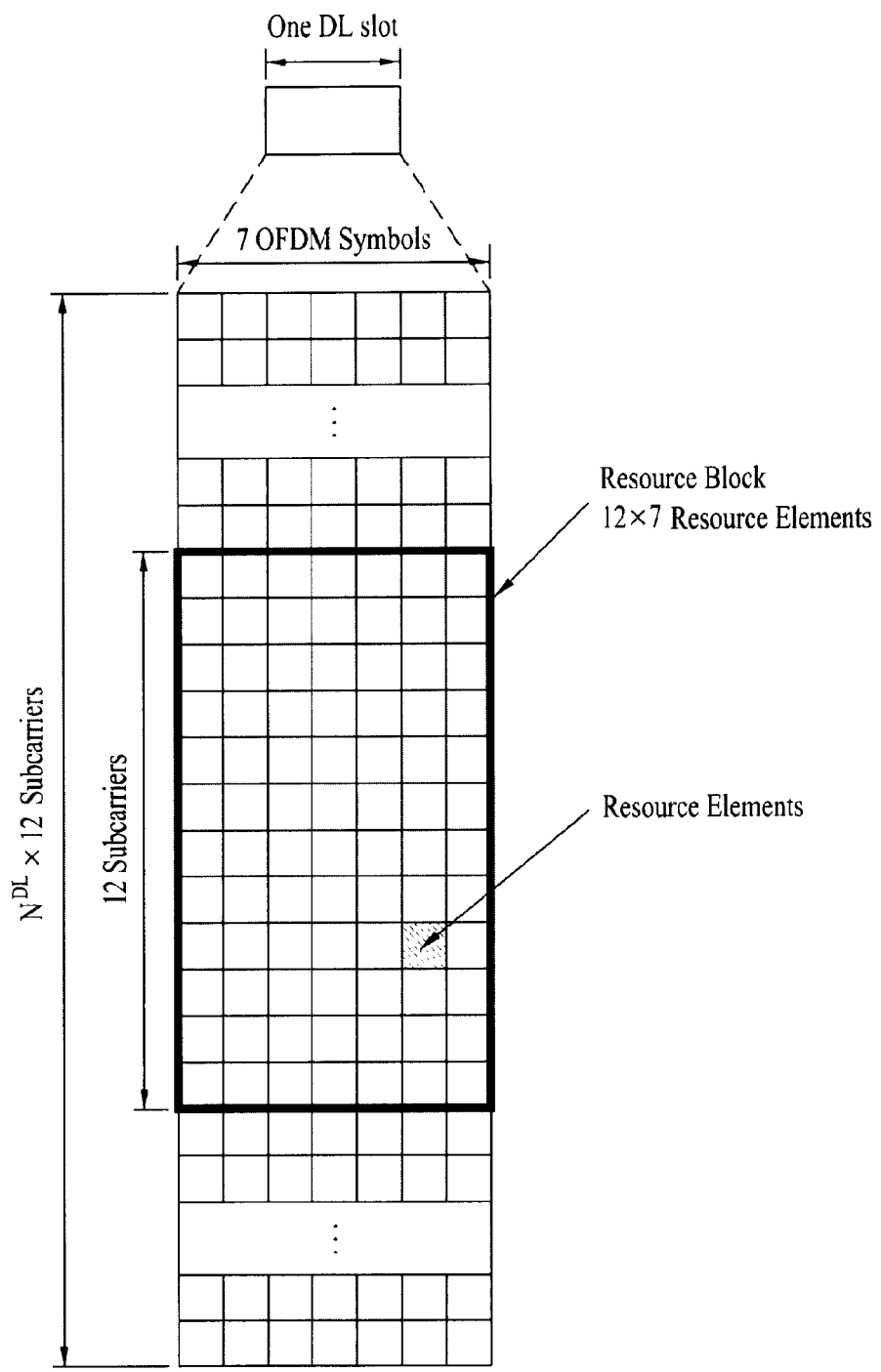
FIG. 2 is a diagram of a resource grid in a downlink slot.

FIG. 2 is a diagram of a resource grid in a downlink (DL) slot. One downlink (DL) slot may include 7 OFDM symbols in a time domain and one resource block (RB) may include 12 subcarriers in a frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12 Error! Objects cannot be created from editing field codes. 7 resource elements. The number $N^{DL}$ of resource blocks included in a DL slot may depend on a DL transmission bandwidth. And, the structure of an uplink (UL) slot may be identical to that of the DL slot.

Figure 3:
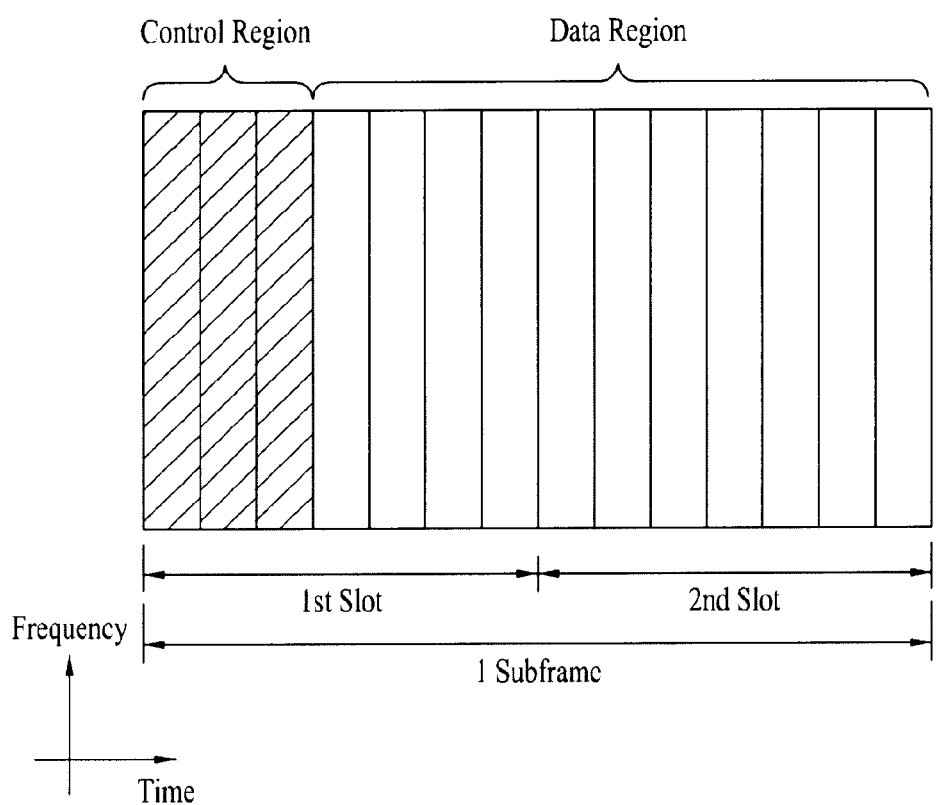
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information transmitted on PDCCH is called DCI (downlink control information). The DCI includes a UL or DL scheduling information or a UL transmission power control command and the like. PDCCH may include a transmission format and resource allocation information of DL-SCH (downlink shared channel), a transmission format and resource allocation information of UL-SCH (uplink shared channel), a paging information on PCH (paging channel), a system information on DL-SCH, a resource allocation information of a higher-layer control message such as a random access response transmitted on PDSCH, a transmission power control command set for individual user equipments within a user equipment group, a transmission power control command, an activation of VoIP (voice over IP) and the like. A plurality of PDCCHs may be transmitted in a control region. A user equipment may be able to monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. If PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIB (system information block)), CRC may be masked with a system information identifier and a system information-RNTI (SI-RNTI). In order to indicate a random access response to a transmission of a random access preamble of a user equipment, CRC may be masked with RA-RNTI (random access-RNTI).

Figure 4:
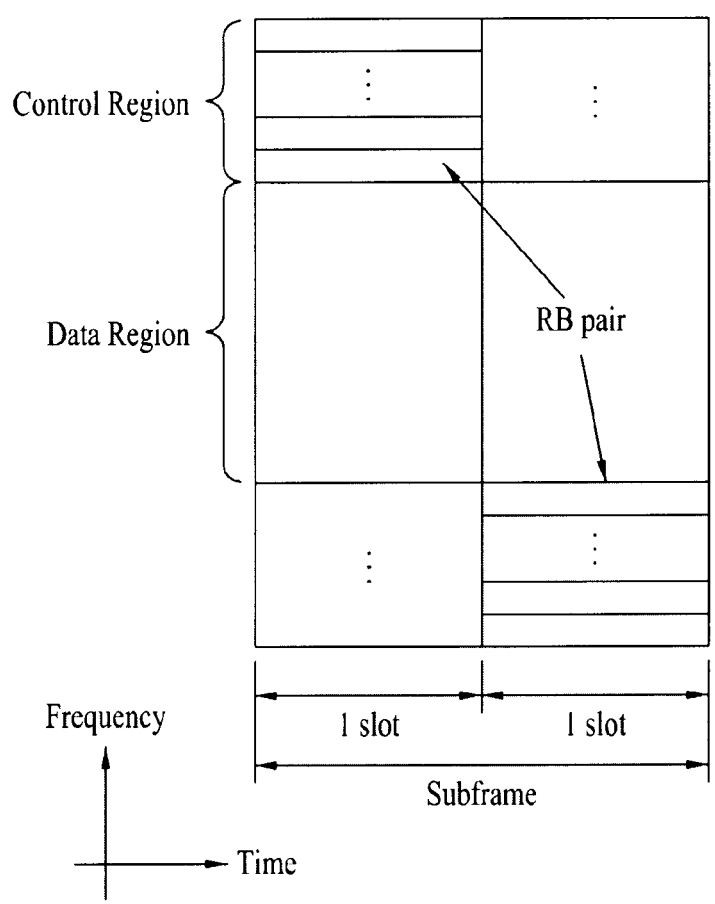
FIG. 4 is a diagram for a structure of an uplink subframe.

FIG. 4 is a diagram for a structure of an uplink (UL) subframe. A UL subframe may be divided into a control region and a data region in a frequency domain. A physical UL control channel (PUCCH) including UL control information may be assigned to the control region. And, a physical UL shared channel (PUSCH) including user data may be assigned to the data region. In order to maintain single carrier property, one user equipment does not transmit PUCCH and PUSCH simultaneously. PUCCH for one user equipment may be allocated to a resource block pair (RB pair) in a subframe. Resource blocks belonging to the resource block pair may occupy different subcarriers for 2 slots. Namely, a resource block pair allocated to PUCCH is frequency-hopped on a slot boundary.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting and receiving data using multiple antennas (MIMO), a channel status between a transmitting antenna and a receiving antenna should be obtained to receive a correct signal. Hence, a separate reference signal needs to be present for each transmitting antenna.

Reference signals can be categorized into a UL (uplink) reference signal and a DL (downlink) reference signal. Currently, LTE system has UL reference signals as follow:

i) DeModulation-Reference Signal (DM-RS) for channel estimation for coherent demodulation of information transmitted on PUSCH and PUCCH; and ii) Sounding Reference Signal (SRS) for a base station to measure a UL channel equality on a network-different frequency.

On the other hand, DL reference signals may include:

i) Cell-specific Reference Signal (CRS) shared by all user equipments in a cell;

ii) UE-specific Reference Signal for a specific user equipment only;

iii) DeModulation-Reference Signal (DM-RS) transmitted for coherent demodulation in case of transmission of PDSCH;

iv) Channel State Information-Reference Signal (CSI-RS) for delivering a channel state information (CSI) in case of transmission of DL DMRS;

v) MBSFN Reference Signal transmitted for coherent demodulation for a signal transmitted in MBSFN (Multimedia Broadcast Single Frequency Network) mode; and vi) Positioning Reference Signal used to estimate geographical location information of a user equipment.

Reference signals can be mainly sorted into two types depending on their purposes. In particular, there are a reference signal for the purpose of channel information acquisition and a reference signal used for data demodulation. Since the object of the former reference signal is to enable a user equipment (UE) to acquire channel information in DL, the former reference signal should be transmitted on a wideband. And, a user equipment should receive the former reference signal despite not receiving DL data in a specific subframe. Moreover, the former reference signal is used in such a situation as a handover and the like. The latter reference signal is sent to a corresponding resource together with a DL signal. A user equipment performs a channel measurement by receiving the corresponding reference signal and is then able to demodulate data. And, the latter reference signal should be transmitted on a data carried region.

CRS is used for the purposes of channel information acquisition and data demodulation. And, a UE-specific reference signal is used for the purpose of data demodulation only. The CRS is transmitted in each subframe for wideband. And, reference signals for maximum 4 antennas are transmitted depending on the number of transmitting antennas of a base station.

For instance, if the number of transmitting antennas of a base station is 2, CRS for antenna port #0 and CRS for antenna port #1 are transmitted. For another instance, if the number of transmitting antennas of a base station is 4, CRSs for antenna ports #0 to #3 are transmitted, respectively.

FIG. 5 is a diagram to illustrate a pattern for CRS and DRS defined in a legacy 3GPP LTE system (e.g., Release-8) to be mapped to a downlink (DL) resource block (RB) pair. A DL RB pair as a unit of mapping a reference signal can be expressed as a unit of '(1 subframe in time)×(12 subcarriers in frequency)'. In particular, a single RB pair has a length of 14 OFDM symbols in case of a normal CP [FIG. 5(a)] or a length of 12 OFDM symbols in case of an extended CP [FIG. 5(b)].

Figure 6:
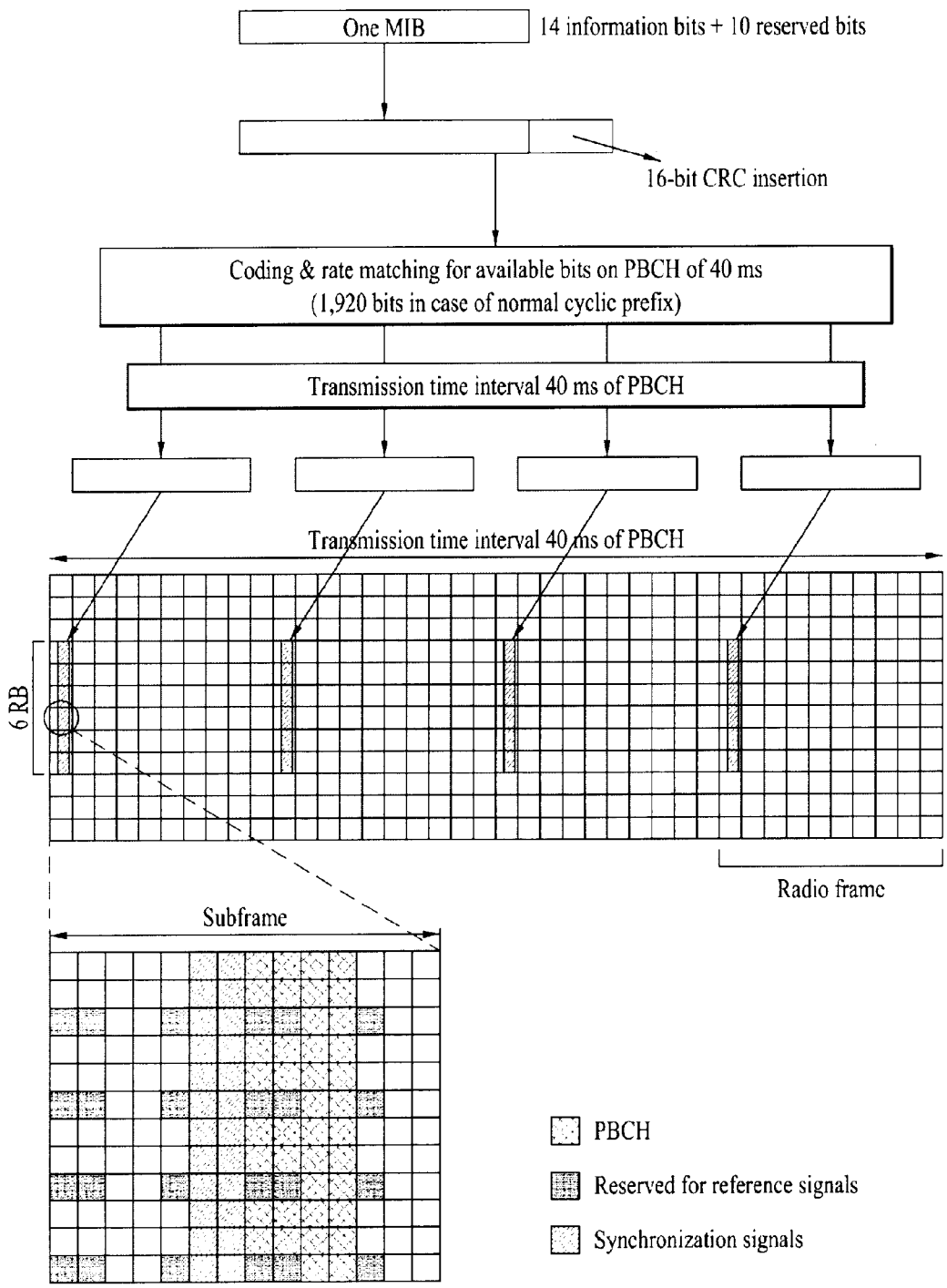
FIG. 6 is a diagram to describe a physical broadcast channel.

FIG. 5 shows a position of a reference signal on an RB pair in a system including a base station that supports 4 transmitting antennas. Referring to FIG. 6, resource elements (REs) denoted by 0, 1, 2 and 3 represent positions of CRSs for antenna port indexes 0, 1, 2 and 3, respectively. Meanwhile, a resource element denoted by D in FIG. 6 indicates a position of DMRS.

PBCH (Physical Broadcast Channel)

FIG. 6 is a diagram to describe PBCH. PBCH is the channel that carries system information corresponding to a mast information block (MIB). The PBCH is used for a user equipment to obtain system information after obtaining synchronization through the aforementioned PSS/SSS and then obtaining a cell identifier. In this case, the MIB may include a downlink cell bandwidth information, a PHICH configuration information, a subframe number (system frame number SFN) and the like.

Regarding MIB, as shown in FIG. 6, a single MIB transport block is transmitted in a $1^{st}$ frame of each of 4 contiguous radio frames. In particular, PBCH is transmitted in first 4 OFDM symbols of a $2^{nd}$ slot of a subframe #0 in each of 4 contiguous radio frames. Hence, PBCH, which carries a single MIB, is transmitted by period of 40 ms. PBCH is transmitted on 72 subcarriers in the middle of a full bandwidth on a frequency axis, which corresponds to 6 RBs of a smallest downlink bandwidth. This is to enable a user equipment to decode BCH without problem despite not knowing a size of a full system bandwidth.

SIB (System Information Block)

As mentioned in the foregoing description, since MIB carries a portion of system information, the rest of system information supposed to be known to a user equipment is carried on SIB. SIB is transmitted through DL-SCH unlike MIB. And, A user equipment is able to know whether SIB is transmitted in a subframe by decoding PDCCH with SI-RNTI (system information radio temporary identifier).

System information carried on SIB is schematically described as follows. First of all, SIB 1 includes basic information required for a user equipment to access a cell (e.g., TDD subframe configuration information, etc.). SIB 2 includes a cell bandwidth, a random access parameter, a parameter related to an uplink power control and the like. SIB 3 includes information related to cell reselection. SIBs 4 to 8 include informations on neighbor cell. Detailed information included in each SIB, which is not described herein, can refer to 3GPP TS 36.331 and the like.

Heterogeneous Network Environment (Heterogeneous Deployments)

Figure 7:
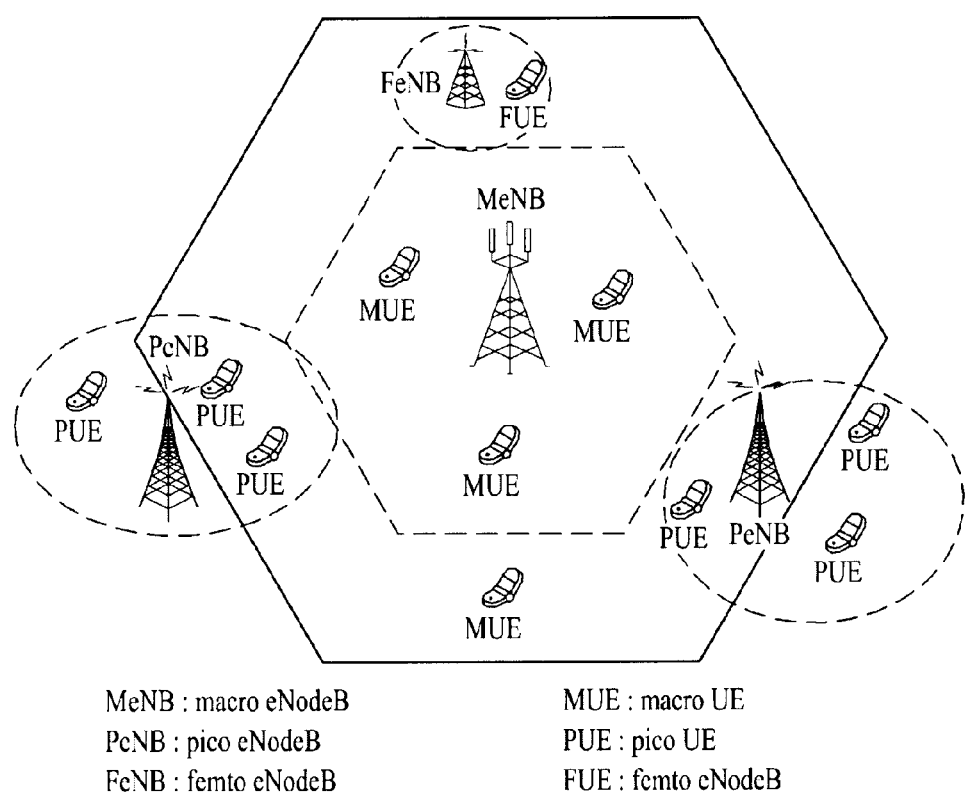
FIG. 7 is a diagram to describe a heterogeneous network environment.

FIG. 7 is a diagram of a heterogeneous network wireless communication system including a macro base station (MeNB) and a micro base station (PeNB or FeNB). In the present document, a terminology 'heterogeneous network (Het Net)' means a network in which a macro base station (MeNB) and a micro base station (PeNB or FeNB) coexist despite using the same RAT (radio access technology).

A macro base station (MeNB) means a general base station of a wireless communication system with a wide coverage and high transmission power. And, the macro base station (MeNB) can be called a macro cell.

A micro base station (PeNB or FeNB) can be named a micro cell, a pico cell, a femto cell, a home eNB (HeNB), a relay or the like for example (each of the micro base station and the macro base station can be generally called a transmission point). The micro base station (PeNB or FeNB) is a small-scale version of the macro base station (MeNB) and is able to operate independently by performing most of the functions of the macro base station. And, the micro base station (PeNB or FeNB) is a base station that can be installed in an area covered by the macro base station, or a base station of a non-overlay type that can be installed in a radio shadow area the base station is unable to cover. Moreover, the micro base station (PeNB or FeNB) has a coverage narrower than that of the macro base station (MeNB) and a transmission power lower than that of the macro base station (MeNB) and is able to accommodate user equipments of which number is smaller than that of the macro base station (MeNB).

A user equipment (hereinafter named a macro-UE) can be directly served by a macro base station (MeNB). And, a user equipment (hereinafter named a micro-UE) can be served by a micro base station (PeNB or FeNB). In some cases, a user equipment (hereinafter abbreviated UE) existing within a coverage of a micron base station (MeNB) can be served by a macro base station (MeNB).

Micro base stations can be categorized in to two kinds of types depending on whether an access of a user equipment is restricted.

A $1^{st}$ type corresponds to an OSG (open access subscriber group) or non-CSG (non-closed access subscriber group) base station and includes a cell that allows an access of an existing macro-UE or an access of a micro-UE of another micron base station. The existing macro-UE or the like is able to make a handover into a base station of the OSG type.

A $2^{nd}$ type corresponds to a CSG base station and does not allow an access of an existing macro-UE or an access of a micro-UE of another micron base station. Hence, the $2^{nd}$ type is unable to make a handover into the CSG base station.

Inter Cell Interference Coordination (ICIC)

In heterogeneous network environment and/or CoMP environment, interference between cells neighboring to each other may cause problems. In order to solve the inter-cell interference problems, it is able to apply inter-cell interference coordination (ICIC).

As one example of ICIC for frequency resource, in 3GPP LTE Release-8 system, defined is a scheme of dividing a given full frequency region (e.g., a system bandwidth) into at least one subregion (e.g., physical resource block (PRB) unit) and then exchanging ICIC messages for the respective frequency subregions between cells. For instance, as information included in an ICIC message for a frequency resource, RNTP (relative narrowband transmission power) related to a downlink transmission power is defined and UL 101 (interference overhead indication) related to uplink interference, UL HII (high interference indication) and the like are defined.

RNTP is the information indicating a downlink transmission power used in a specific frequency subregion by a cell that sends an ICIC message. For instance, if an RNTP field for a specific frequency subregion is set to a $1^{st}$ value (e.g., 0), it may mean that a downlink transmission power of a corresponding cell in a corresponding frequency subregion does not exceed a prescribed threshold. For another instance, if an RNTP field for a specific frequency subregion is set to a $2^{nd}$ value (e.g., 1), it may mean that a corresponding cell in a corresponding frequency subregion is unable to make a promise a downlink transmission power. In other words, if a value of an RNTP field is 0, a downlink transmission power of a corresponding cell in a corresponding frequency subregion can be regarded as low. Yet, if a value of an RNTP field is 1, a downlink transmission power of a corresponding cell in a corresponding frequency subregion cannot be regarded as low.

UL IOI is the information indicating an amount of uplink interference experienced (or received) in a specific frequency subregion by a cell that sends an ICIC message. For instance, if an IOI field for a specific frequency subregion is set to a value corresponding to a high interference amount, it may mean that a corresponding cell experiences strong uplink interference in a corresponding frequency subregion. Having received an ICI message, a cell is able to schedule a user equipment, which uses a low uplink transmission power among user equipments served by the corresponding cell, in a frequency subregion corresponding to an IOI indicating strong uplink interference. Hence, since user equipments performs uplink transmissions with low transmission power in the frequency subregion corresponding to the IOI indicating the strong uplink interference, it is able to mitigate uplink interference experienced by a neighbor cell (i.e., a cell having transmitted ICIC message).

UL HII is the information indicating a level of interference (or uplink interference sensitivity) that may be triggered to a corresponding frequency subregion by an uplink transmission from a cell that sends an ICIC message. For instance, if an HII field for a specific frequency subregion is set to a $1^{st}$ value (e.g., 1), it may mean that the ICIC message sending cell possibly schedules a user equipment of a strong uplink transmission power for a corresponding frequency subregion. For another instance, if an HII field for a specific frequency subregion is set to a $2^{nd}$ value (e.g., 0), it may mean that the ICIC message sending cell possibly schedules a user equipment of a weak uplink transmission power for a corresponding frequency subregion. Meanwhile, having received an ICIC message, a cell preferentially schedules a user equipment in a frequency subregion having HII set to a $2^{nd}$ value (e.g., 0) and also schedules user equipments capable of operating well despite strong interference in a frequency subregion having HII set to a $1^{st}$ value (e.g., 1), thereby avoiding interference from an ICIC message sending cell.

Meanwhile, as one example of ICIC for time resource, in 3GPP LTE-A (or 3GPP LTE Release-10) system, defined is a scheme of dividing a given full frequency region into at least one subregion (e.g., subframe unit) and then exchanging a presence of non-presence of silencing for the respective frequency subregions between cells. An ICIC message sending cell is able to deliver information, which indicates that silencing is performed in a specific subframe, to neighbor cells and does not schedule PDSCH or PUSCH in the corresponding subframe. Meanwhile, an ICIC message receiving cell can schedule uplink and/or downlink transmission for a user equipment in a subframe having silencing performed therein by the ICIC message sending cell.

Silencing may mean an operation that a specific cell does not perform most of signal transmissions in uplink and downlink in a specific subframe (or performs transmission with zero or weak power). For instance, if a specific cell can configure a specific subframe as 'ABS with MBSFN (Almost Blank Subframe (ABS) with Multicast Broadcast Single Frequency Network' subframe. In a downlink subframe configured as the 'ABS with MBSFN' subframe, referring to FIG. 8(a), a signal is transmitted in a control region only, while a signal is not transmitted in a data region. For another example of a silencing operation, an interference causing cell may be able to configure a specific subframe as ABS (almost blank subframe). According to the ABS, referring to FIG. 8(b), CRS is transmitted in a control region and a data region of a downlink subframe but other control information and data are not transmitted (or transmission of weak power is performed only). Yet, in the ABS, downlink channels and downlink signals (e.g., PBCH, PSS, SSS, etc.) can be transmitted. Thus, the silencing can be performed by a unit of a specific subframe. And, information indicating a presence or non-presence of performing the silencing can be named an ABS subframe pattern. (In the following description, ABS can be understood as meaning 'ABS with MBSFN' or 'ABS' unless mentioned especially.)

In the following description, ABS is described. First of all, ABS related signaling, which is currently regulated by 3GPP LTE-A standard, mainly includes ABS information and ABS status. The ABS information is the information that indicates a bitmap of a subframe that will be used as an ABS. In FDD, the ABS information is configured as a bitmap with 40 bits. In TDD, the ABS information is configured as a bitmap with maximum 70 bits depending on UL-DL configuration. For example, in case of FDD, 40 bits indicate 40 subframes. If a bit value is 1, it indicates ABS. If a bit value is 0, it indicates non-ABS. When a limited measurement is configured for a UE, the number of CRS antenna ports of a corresponding cell is notified for CRS measurement. A measurement subset is a subset of an ABS pattern information. And, the measurement subset, which is a bitmap of 40 bits in FDD or a bitmap of maximum 70 bits in TDD, can be understood as a recommendation of a sort of a limited measurement to configure a limited measurement for a user equipment. An ABS status information element is used for the purpose of helping whether an eNB should change an ABS pattern.

Figure 9:
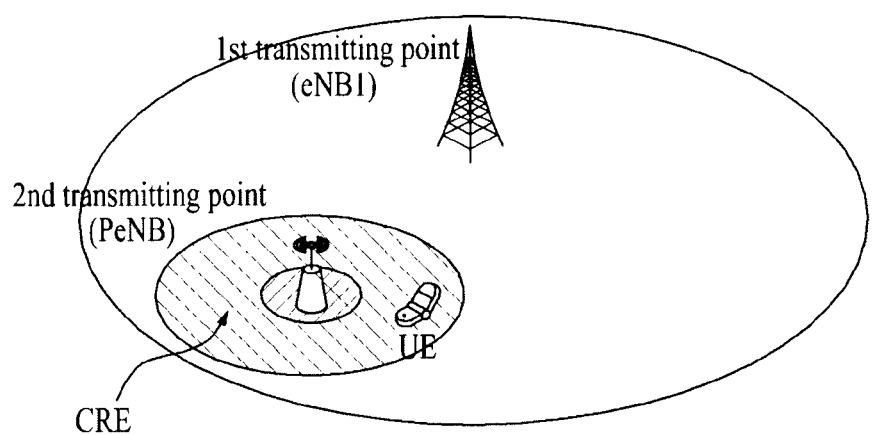
FIG. 9 and FIG. 10 are diagrams to describe embodiments of the present invention.

FIG. 9 is a diagram to describe inter-cell interference coordination of a heterogeneous network. In FIG. 9, a macro base station (eNB1, hereinafter named a $1^{st}$ transmitting point) and a pico base station (PeNB, hereinafter named a $2^{nd}$ transmitting point) are included for example. The $1^{st}$ transmitting point transmits a signal with a transmission power greater than that of the $2^{nd}$ transmitting point. When a user equipment receives a signal from the $2^{nd}$ transmitting point, the $1^{st}$ transmitting point works as a dominant interference. Hence, the $1^{st}$ transmitting point can be called an aggressor cell. The $2^{nd}$ transmitting point, to which interference is caused, can be called a victim cell. And, a user equipment (UE) can be called a victim UE.

The $1^{st}$ transmitting point can configure ABS for interference mitigation. In this case, the $2^{nd}$ transmitting point can perform a scheduling on a user equipment using a subframe configured as ABS by the $1^{st}$ transmitting point and a subframe aligned on a time axis. (This means that a cell range expansion (CRE) of the $2^{nd}$ transmitting point is possible.) Yet, in case that the subframe configured as the ABS by the $2^{nd}$ transmitting point is 'ABS' for transmitting CRS or 'reduced ABS' capable of performing a signal transmission of a weak size despite 'ABS with MBSFN', CRS can still interfere with a signal reception of a victim user equipment.

In this case, for a method of reducing interference influence, the following can be taken as examples. First of all, a transmitting side (e.g., the $2^{nd}$ transmitting point in FIG. 9) may not transmit a signal on RE corresponding to CRS configuration of an aggressor cell [Rate matching]. When a receiving side (e.g., the user equipment (UE) in FIG. 9) receives a signal, RE corresponding to CRS configuration of an aggressor cell can be punctured. And, a user equipment having interference cancellation capability can cancel CRS of an aggressor cell. The above-mentioned methods are application only if a victim user equipment is aware of CRS configuration of the $1^{st}$ transmitting point (e.g., a neighbor cell of the $2^{nd}$ transmitting point corresponding to a serving cell).

A user equipment can be aware of CRS configuration of a neighbor cell by a method i) for a serving cell to signal a CRS configuration of a neighbor cell or a method ii) for a user equipment to obtain a CRS configuration by receiving PBCH/SIB of a neighbor cell. Yet, the method ii) needs to appropriately update the PBCH/SIB of the neighbor cell to prepare for a case that the CRS configuration of the neighbor cell is changed. For instance, the necessity for update will further increase in case of Power On/Off RRH (radio remote head) or the like. If the user equipment receives PBCH/SIB of the neighbor cell by keeping up with the CRS configuration change of the neighbor cell, it is able to considerably reduce the overhead generated from the unnecessary reception of PBCH/SIB by the user equipment failing to keep up with the CRS configuration change.

Therefore, the present invention proposes that a serving cell signals information in order to check a presence or non-presence of a CRS configuration change of a neighbor cell. Such signaling is described in detail as follows.

In order for a user equipment to check a presence or non-presence of a CRS configuration change of a neighbor cell, a serving cell is able to signal a valid period of the neighbor cell CRS configuration decoded by the user equipment. In particular, the serving cell is able to signal that the neighbor cell CRS configuration currently known to the user equipment is valid until a prescribed timing point. In this case, the signaled prescribed timing point may mean probability that the neighbor cell CRS configuration may be changed after the corresponding timing point. In order to minimize a signaling overhead, it is able to use 1-bit flag. For instance, if a flag is 'on', it may indicate that CRS configuration is valid until a current PBCH interval (40 ms) of the neighbor cell. And, a valid period of a current neighbor cell CRS configuration can be signaled by radio frame units.

Serving cell's signaling of a presence or non-presence of a neighbor cell CRS configuration change may include a delivery of an indicator indicating whether a user equipment should obtain system information of a neighbor cell. In other words, the serving cell can signal an information indicating that the user equipment should decode PBCH/SIB of the neighbor cell. This information may include an indication information indicating that the user equipment should decode the PBCH/SIB of the neighbor cell in a next radio frame.

As serving cell's signaling for a user equipment to check a presence or non-presence of a neighbor cell CRS configuration change, the serving cell can notify that the user equipment should decode PBCH or SIB. The number of antenna ports related to a CRS transmission of the neighbor cell can be known through blind decoding on neighbor cell PBCH. And, a presence or non-presence of MBSFN subframe can be known through SIB. Since the antenna port number is not an easily changeable parameter, it is able to signal what signal should be decoded by the user equipment in accordance with a configuration (e.g., number of ports, MBSFN subframe pattern, etc.) changed to reduce a decoding overhead. In particular, it is able to signal whether to blind-decode PBCH or the neighbor cell or whether to decode SIB.

As an information for a user equipment to check a presence or non-presence of a neighbor cell CRS configuration change, a valid period of PBCH/SIB can be signaled together when each cell transmits the PBCH/SIB. In this case, having detected the neighbor cell PBCH/SIB, the user equipment can perform the detection again after the corresponding valid period on the assumption that the PBCH/SIB for the corresponding cell is not changed for the corresponding valid period.

On the assumption that CRS configuration obtained from system information received from the neighbor cell by the user equipment is valid for a prescribed time, the detection can be performed again after the corresponding valid period. For instance, the user equipment can regard 40 ms, which corresponds to a signaling interval of PBCH, as a valid time of the corresponding PBCH/SIB. In this case, the 40 ms can be regarded as valid for a period of 4 radio frames from a detected timing point or can be interpreted as valid a PBCH period corresponding to the detected timing point. Moreover, this may be interpreted as PBCH/SIB information is not valid after the corresponding valid period.

As another method for a user equipment to know a presence or non-presence of a neighbor cell CRS configuration change, a serving cell can signal an aggressor cell list to the user equipment. In this case, the aggressor cell list may be a subset of a cell list delivered on SIB in an existing LTE/LTE-S system and can include MBSFN pattern information (e.g., MBSFN subframe configuration).

The user equipment is able to know whether a CRS configuration of a specific cell has been changed (or will be changed) by checking whether each cell included in the aggressor cell list has a linked MBSFN pattern information. In particular, referring now to FIG. 9, the user equipment checks whether the $1^{st}$ transmitting point and (simultaneously) checks a presence or non-presence of the $1^{st}$ transmitting point linked to (or included in) the aggressor cell list. If the MBSFN pattern information is not present, the user equipment determines that the CRS configuration of the $1^{st}$ transmitting point is not changed. Otherwise, if the MBSFN pattern information is present, the user equipment can determine that the CRS configuration of the $1^{st}$ transmitting point is changed.

If there is no change between the MBSFN pattern information linked to the specific cell in the aggressor cell list and a previous MBSFN pattern information, this may indicate that a specific information (i.e., the number of antenna ports) in the CRS configuration has been changed.

Meanwhile, a user equipment can be aware whether its neighbor cell is an aggressor cell using a neighbor cell list and MBSFN pattern information. For instance, if an MBSFN pattern is not present at a subfield of a specific cell in the neighbor cell list, the user equipment can determine that the corresponding cell is not a dominant interference, i.e., an aggressor cell. If the MBSFN pattern is present, the user equipment determines that the corresponding cell is the aggressor cell and is able to consider interference cancellation, rate matching, puncturing, and the like.

Figure 10:
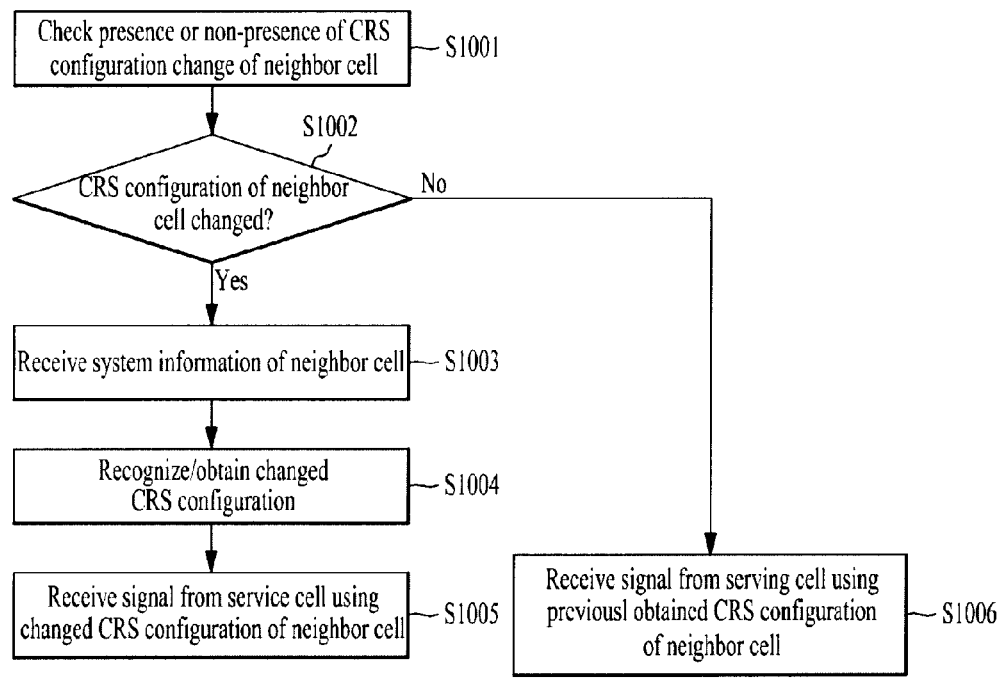

FIG. 10 is a diagram to describe an operation of a user equipment according to an embodiment of the present invention. Referring to FIG. 10, in a step S1001 and a step S1002, a user equipment can check/determine a presence or non-presence of a CRS configuration change of a neighbor cell. In doing so, in order for the user equipment to check the presence or non-presence of the CRS configuration change of the neighbor cell, it is able to use the signaling (e.g., signaling of a valid period, an indicator indicating whether to obtain system information of the neighbor cell, an information indicating which one of PBCH and SIB should be decoded, signaling of an aggressor cell list, etc.) from various kinds of serving cells, addition of valid period information to PBCH, assumption of the user equipment and the like.

If the user equipment determines that the CRS configuration of the neighbor cell has been changed (or will be changed), in a step S1003, the user equipment can receive system information of the neighbor cell. In a step S1004, the user equipment can recognize/obtain the changed CRS configuration based on the received system information. Thereafter, in a step S1005, the user equipment can receive a signal from a serving cell by the aforementioned interference mitigating method (e.g., rate matching, etc.) using the changed CRS configuration of the neighbor cell. If the CRS configuration of the neighbor cell is determined as not changed in the step S1002, in a step S1006, the user equipment can receive a signal by the aforementioned interference mitigating method based on the obtained CRS configuration of the neighbor cell.

In the above-described operation of the user equipment, the further detailed descriptions can refer to the former descriptions and are omitted from the following description to avoid redundant descriptions.

As mentioned in the above description, the signaling for a user equipment to check a presence or non-presence of a CRS configuration change of a neighbor cell can be indicated in a manner of being limited to a change of a CRS configuration in order to reduce signaling overhead and detection complexity of the user equipment. For instance, in case of a change of the number of CRS ports or a change of an MBSFN configuration, the above-mentioned signaling can be performed. This can be understood as a change of system information having nothing to do with the CRS configuration cannot trigger the above-described signaling.

And, the above-described signaling can be performed independently or through combination. For instance, in a next radio frame, it is able to signal that a neighbor cell SIB should be decoded.

Moreover, the signaling can be performed through paging, DCI format, RRC signaling, SIB inclusion, L1/L2 signaling or the like. The signaling used for indication can be determined in accordance with signaling granularity of a corresponding information. At a timing point of the above-described signaling (or, until a changed CRS configuration of a neighbor cell is applied to a user equipment), it is preferable that a serving cell does not perform a scheduling on the user equipment.

The present invention is applicable to a multi-cell environment by performing a signaling with a cell ID of each cell. And, the present invention is applicable to a user equipment having interference cancellation capability. In particular, since cancellation of interference with a cell other than a dominant interference cell may feed back a link quality excessively better than a real link quality, appropriate restriction is necessary. For such restriction, the present invention may be usable.

A user equipment capable of CRS interference handling can inform a serving cell of a presence or non-presence of interference handling or can make a request for a measurement interval for a neighbor cell measurement to the serving cell.

Figure 11:
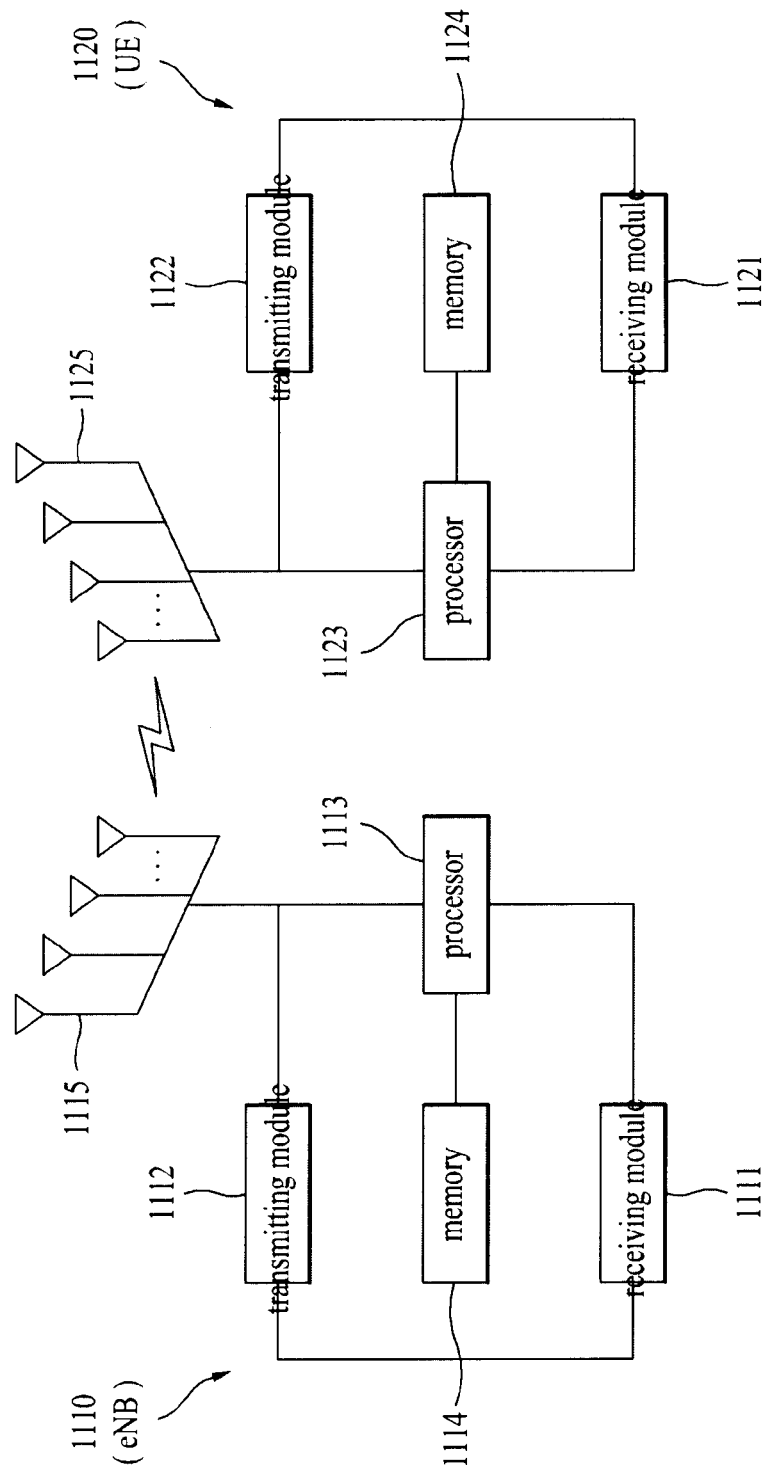
FIG. 11 is a diagram for configuration of a transceiving device.

FIG. 11 is a diagram for configurations of a transmitting point device and a user equipment device according to the present invention.

Referring to FIG. 11, a transmitting point device 1110 according to the present invention may include a receiving module 1111, a transmitting module 1112, a processor 1113, a memory 1114 and a plurality of antennas 1115. A plurality of the antennas 1115 may mean a transmitting point device supportive of MIMO transmission and reception. The receiving module 1111 can receive various signals, data and information in uplink from a user equipment. The transmitting module 1112 can transmit various signals, data and information in downlink to the user equipment. And, the processor 1113 can control overall operations of the transmitting point device 1110.

The processor 1113 of the transmitting point device 1110 according to one embodiment of the present invention can operate to perform the methods mentioned in the foregoing description.

The processor 1113 of the transmitting point device 1110 performs functions of operating and processing information received by the transmitting point device 1110, information to be transmitted by the transmitting point device 1110, and the like. The memory 1114 can store the operated and processed information and the like for a prescribed period and can be substituted with such a component as a buffer (not shown in the drawing) and the like.

Referring to FIG. 11, a user equipment device 1120 according to the present invention may include a receiving module 1121, a transmitting module 1122, a processor 1123, a memory 1124 and a plurality of antennas 1125. A plurality of the antennas 1125 may mean a user equipment device supportive of MIMO transmission and reception. The receiving module 1121 can receive various signals, data and information in downlink from a transmitting point. The transmitting module 1122 can transmit various signals, data and information in uplink to the transmitting point. And, the processor 1123 can control overall operations of the user equipment device 1120.

The processor 1123 of the user equipment device 1120 according to one embodiment of the present invention can operate to perform the methods mentioned in the foregoing description.

The processor 1123 of the user equipment device 1120 performs functions of operating and processing information received by the user equipment device 1120, information to be transmitted by the user equipment device 1120, and the like. The memory 1124 can store the operated and processed information and the like for a prescribed period and can be substituted with such a component as a buffer (not shown in the drawing) and the like.

In the above-mentioned detailed configurations of the transmitting point device 1110 and the user equipment device 1120, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 1110 with reference to FIG. 11 may be identically applicable to a relay node device as a DL transmitting entity or a UL receiving entity. And, the description of the user equipment device 1120 with reference to FIG. 11 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope that matches the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of receiving a signal by a user equipment in a wireless communication system, comprising the steps of:
   receiving a physical broadcast channel (PBCH) or a system information block (SIB) of a neighbor cell;
   receiving information regarding a valid period of the PBCH or the SIB; and
   checking, during the valid period whether, a cell specific reference signal (CRS) configuration of the neighbor cell has changed based on the PBCH or the SIB;
   if the CRS configuration of the neighbor cell has changed, then determining the changed CRS configuration by receiving system information of the neighbor cell, and
   receiving a signal from a serving cell using the changed CRS configuration of the neighbor cell; and if the CRS configuration of the neighbor cell has not changed, then checking whether the CRS configuration of the neighbor cell has changed after the valid period has lapsed.

2. The method of claim 1, wherein the user equipment further receives an indicator indicating which one of the transmitted PBCH and the transmitted SIB should be decoded.

3. The method of claim 1, wherein the signal received from the serving cell does not include data in a resource element corresponding to the changed CRS configuration of the neighbor cell.

4. The method of claim 1, the signal receiving step comprises the step of puncturing a resource element corresponding to the changed CRS configuration of the neighbor cell.

5. A user equipment device in a wireless communication system, the user equipment device comprising:

a receiving module; and a processor that receives a physical broadcast channel (PBCH) or a system information block (SIB) of a neighbor cell, receives information on a valid period of the PBCH or the SIB, checks, during the valid period, whether a cell specific reference signal (CRS) configuration of the neighbor cell has changed based on the PBCH or the SIB;

wherein, if the CRS configuration of the neighbor cell has changed, then the processor determines the changed CRS configuration by receiving system information of the neighbor cell, and receives a signal from a serving cell using the changed CRS configuration of the neighbor cell; and if the CRS configuration of the neighbor cell has not changed, then the processor again whether the CRS configuration of the neighbor cell has changed after the valid period has lapsed.

* * * * *